S. H. WIGHTMAN AND T. A. LONG.
METHOD OF AND MACHINE FOR THE MANUFACTURE OF TILE, BRICK, &c.
APPLICATION FILED MAR. 19, 1919. RENEWED JULY 6, 1920.

1,369,864.

Patented Mar. 1, 1921.

14 SHEETS—SHEET 2.

S. H. WIGHTMAN AND T. A. LONG.
METHOD OF AND MACHINE FOR THE MANUFACTURE OF TILE, BRICK, &c.
APPLICATION FILED MAR. 19, 1919. RENEWED JULY 6, 1920.

1,369,864.

Patented Mar. 1, 1921.

14 SHEETS—SHEET 3.

WITNESSES

INVENTOR

S. H. WIGHTMAN AND T. A. LONG.
METHOD OF AND MACHINE FOR THE MANUFACTURE OF TILE, BRICK, &c.
APPLICATION FILED MAR. 19, 1919. RENEWED JULY 6, 1920.
1,369,864.
Patented Mar. 1, 1921.
14 SHEETS—SHEET 7.
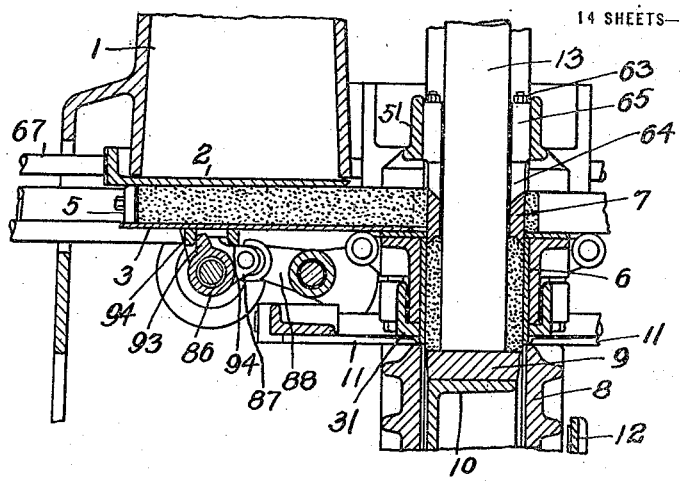
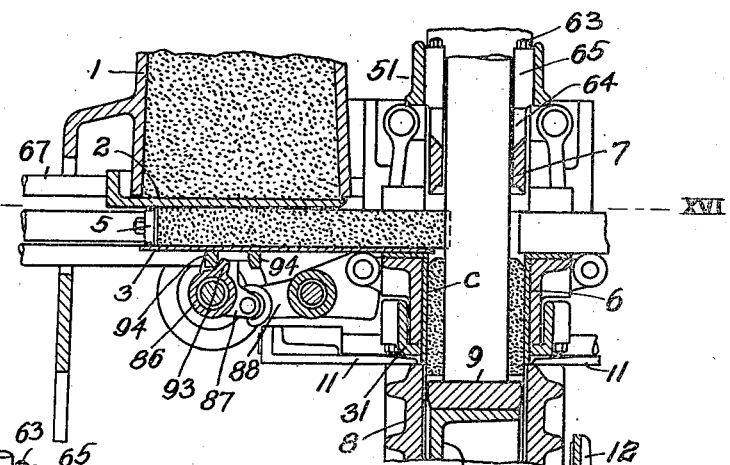
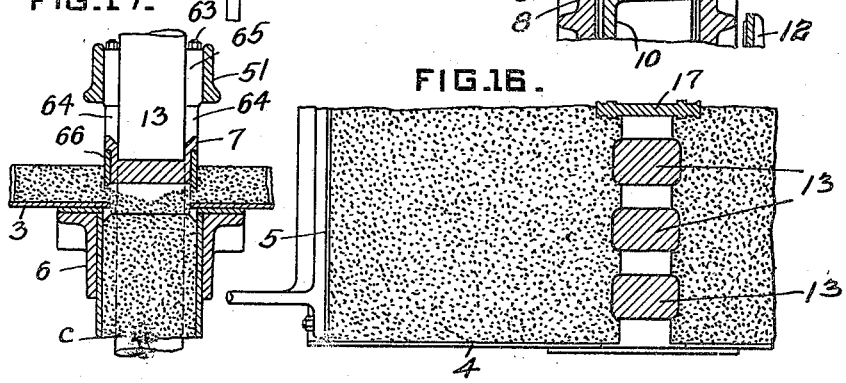
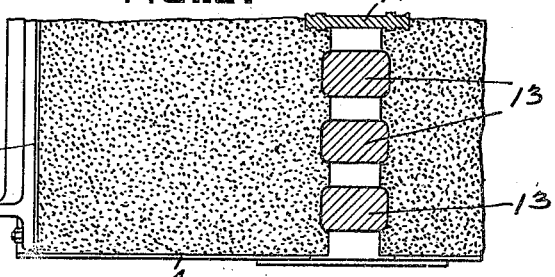

S. H. WIGHTMAN AND T. A. LONG.
METHOD OF AND MACHINE FOR THE MANUFACTURE OF TILE, BRICK, &c.
APPLICATION FILED MAR. 19, 1919. RENEWED JULY 6, 1920.

1,369,864.

Patented Mar. 1, 1921.
14 SHEETS—SHEET 8.

WITNESSES

INVENTOR

S. H. WIGHTMAN AND T. A. LONG.
METHOD OF AND MACHINE FOR THE MANUFACTURE OF TILE, BRICK, &c.
APPLICATION FILED MAR. 19, 1919. RENEWED JULY 6, 1920.

1,369,864.

Patented Mar. 1, 1921.
14 SHEETS—SHEET 9.

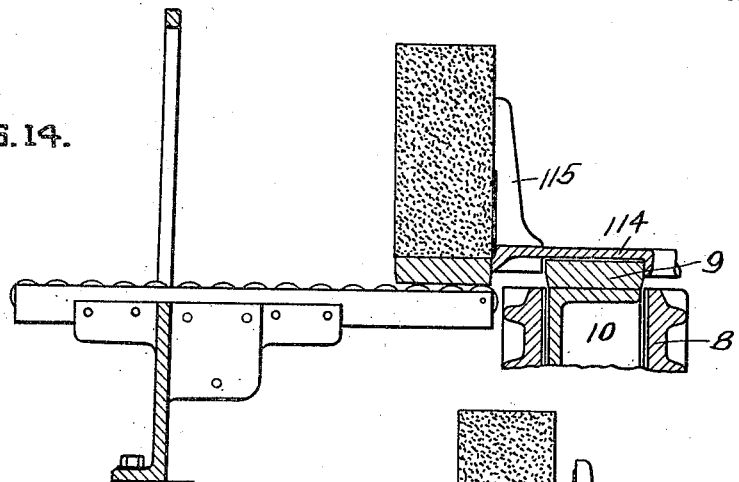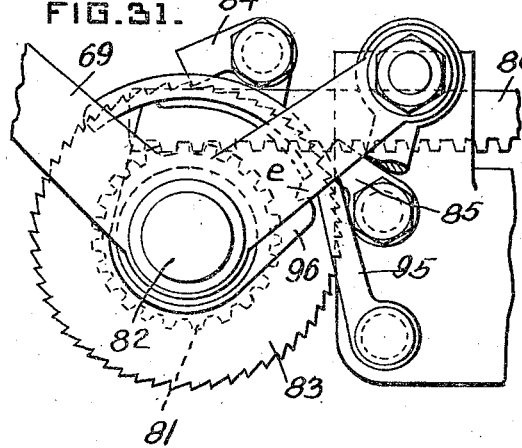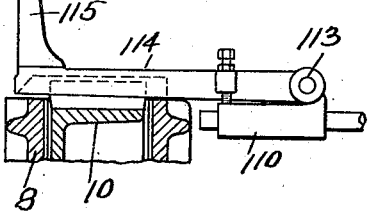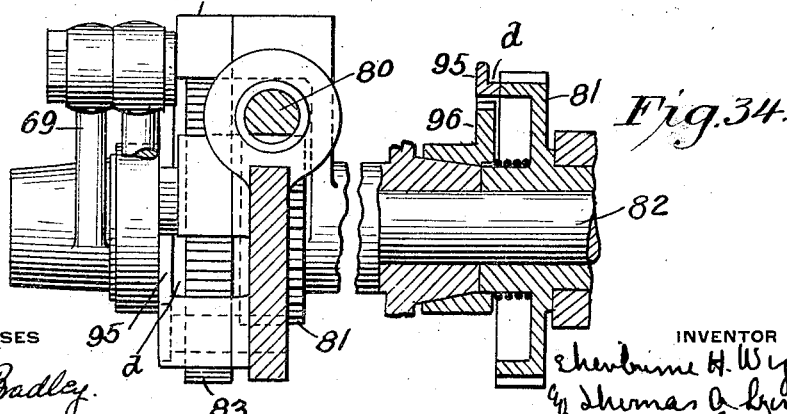

S. H. WIGHTMAN AND T. A. LONG.
METHOD OF AND MACHINE FOR THE MANUFACTURE OF TILE, BRICK, &c.
APPLICATION FILED MAR. 19, 1919. RENEWED JULY 6, 1920.
1,369,864.
Patented Mar. 1, 1921.
14 SHEETS—SHEET 11.
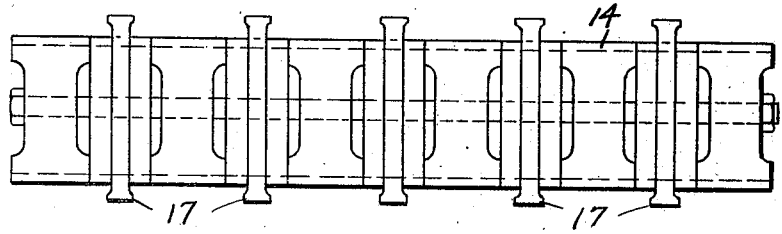
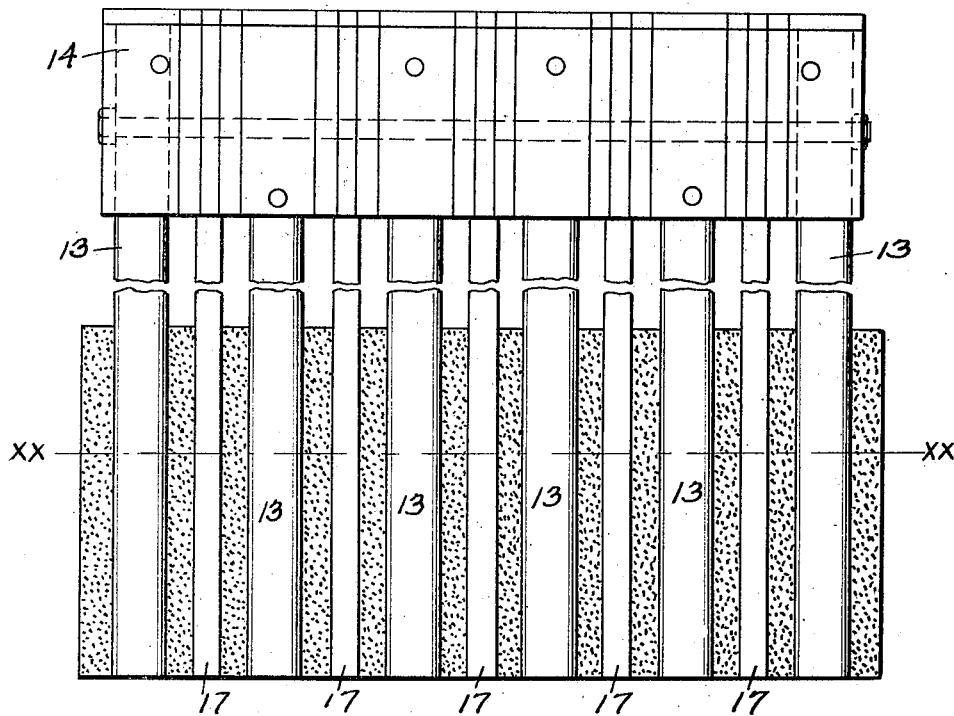
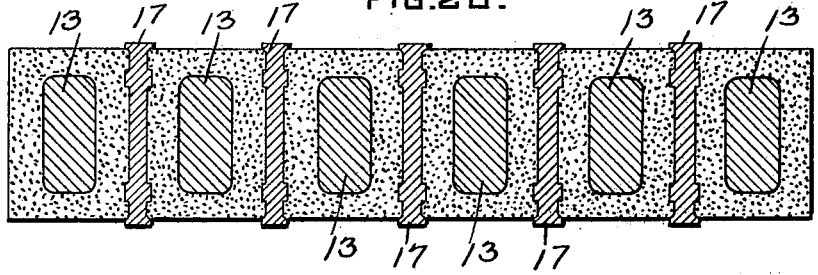

S. H. WIGHTMAN AND T. A. LONG.
METHOD OF AND MACHINE FOR THE MANUFACTURE OF TILE, BRICK, &c.
APPLICATION FILED MAR. 19, 1919. RENEWED JULY 6, 1920.

1,369,864.

Patented Mar. 1, 1921.
14 SHEETS—SHEET 12.

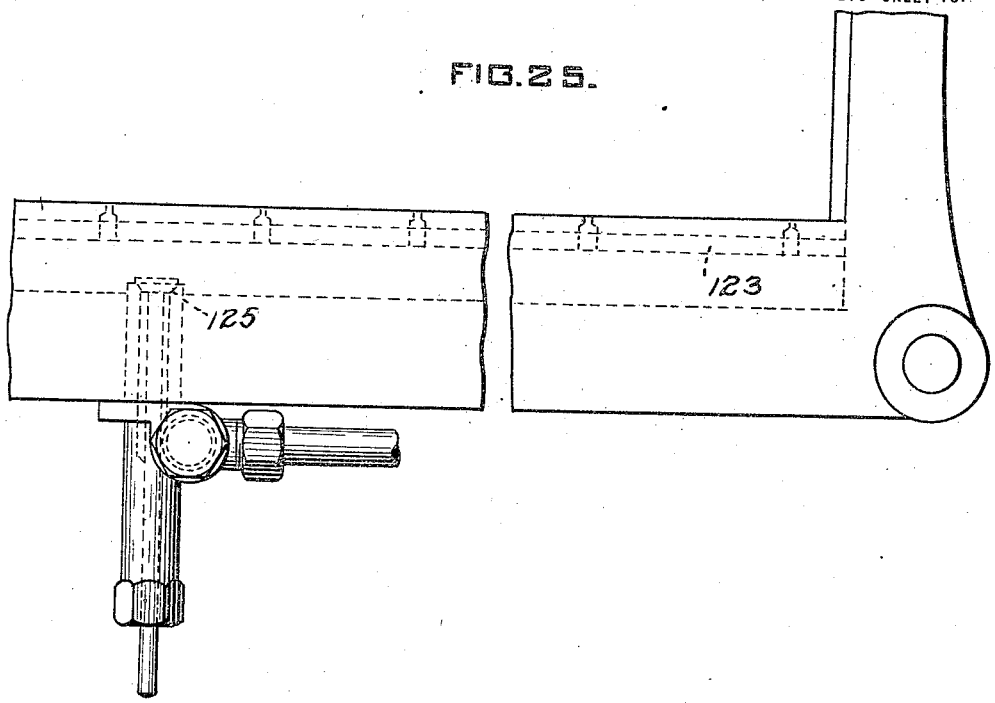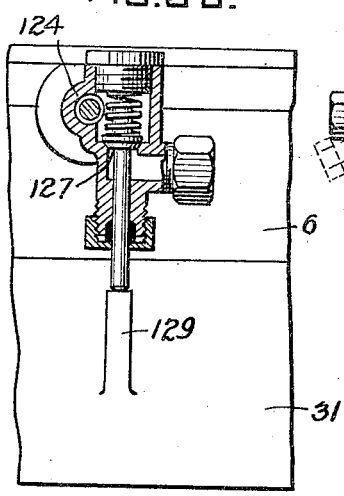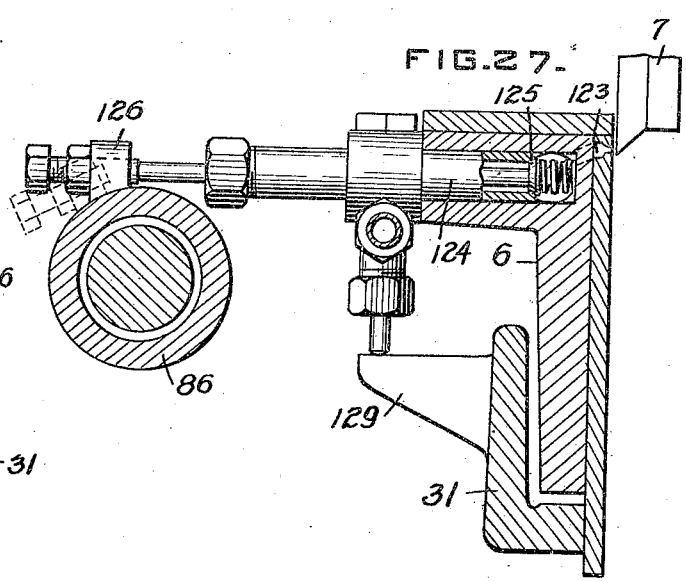

S. H. WIGHTMAN AND T. A. LONG.
METHOD OF AND MACHINE FOR THE MANUFACTURE OF TILE, BRICK, &c.
APPLICATION FILED MAR. 19, 1919. RENEWED JULY 6, 1920.

1,369,864.

Patented Mar. 1, 1921.
14 SHEETS—SHEET 14.

UNITED STATES PATENT OFFICE.

SHERBURNE H. WIGHTMAN, OF BIRMINGHAM, MICHIGAN, AND THOMAS A. LONG, OF MELROSE HIGHLANDS, MASSACHUSETTS, ASSIGNORS TO WIGHTMAN CONCRETE PRODUCTS, INCORPORATED, OF PITTSBURGH, PENNSYLVANIA, A CORPORATION OF DELAWARE.

METHOD OF AND MACHINE FOR THE MANUFACTURE OF TILE, BRICK, &c.

1,369,864.  Specification of Letters Patent.  Patented Mar. 1, 1921.

Application filed March 19, 1919, Serial No. 283,515. Renewed July 6, 1920. Serial No. 394,234.

*To all whom it may concern:*

Be it known that we, SHERBURNE H. WIGHTMAN and THOMAS A. LONG, residing, respectively, at Birmingham, in the county of Oakland, State of Michigan, and Melrose Highlands, in the county of Middlesex, State of Massachusetts, citizens of the United States, have invented or discovered certain new and useful Improvements in Methods of and Machines for the Manufacture of Tile, Brick, &c., of which improvements the following is specification.

Figure 1:
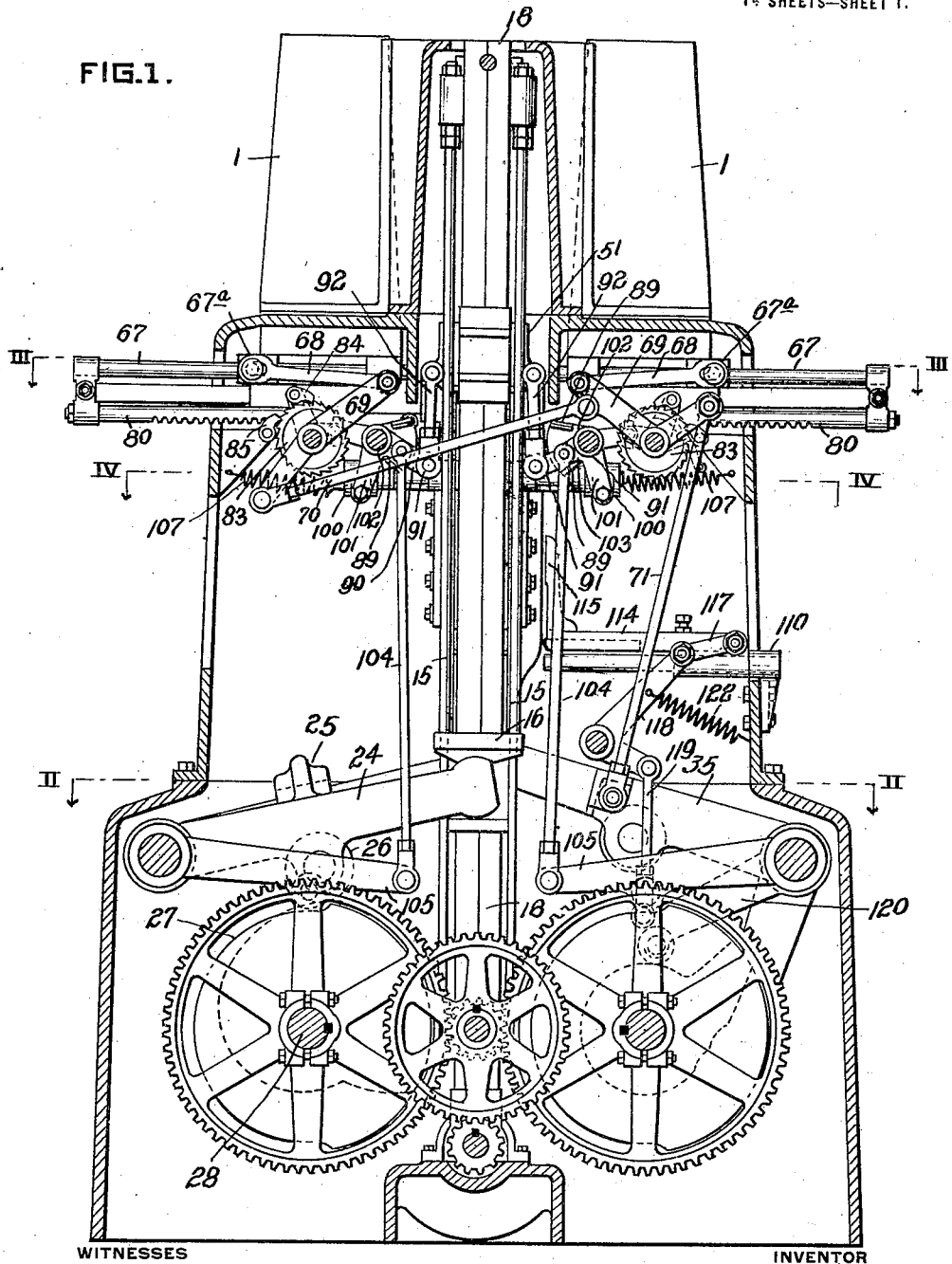
Figure 2:
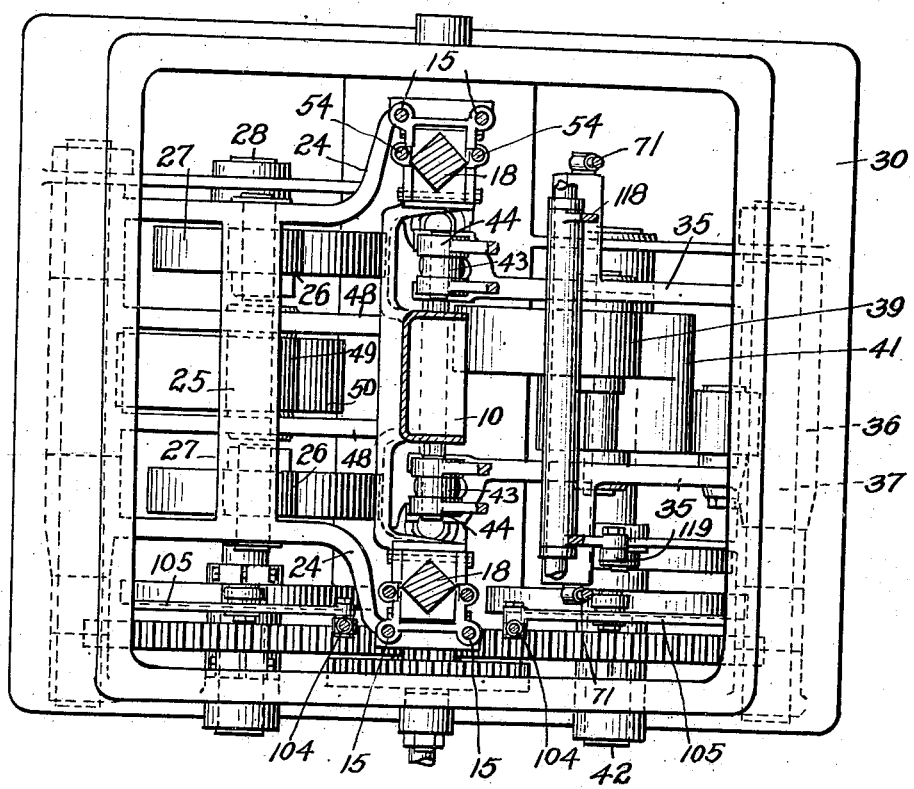
Figure 3:
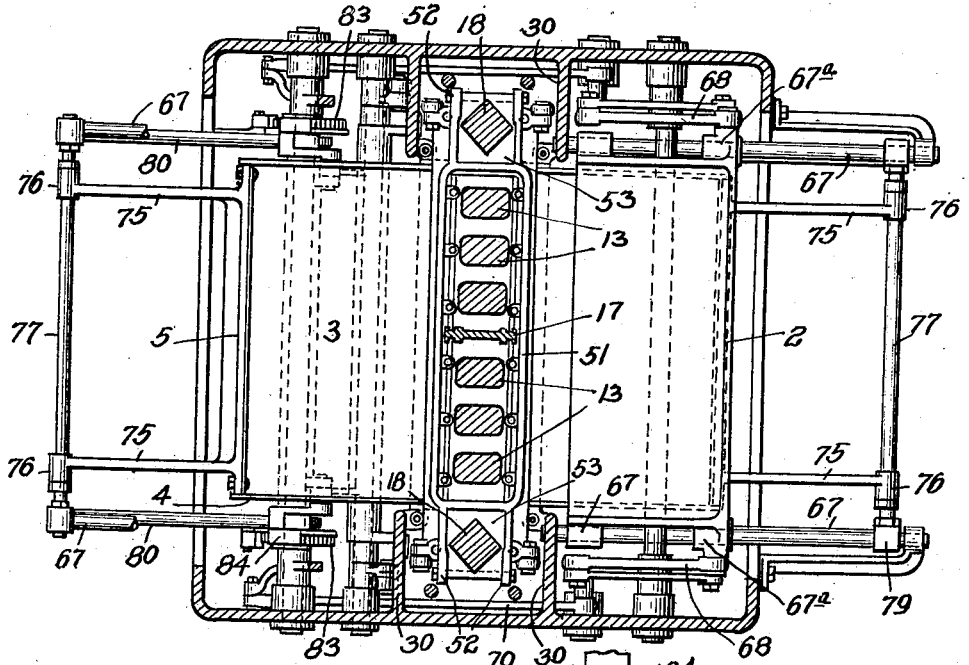
Figure 4:
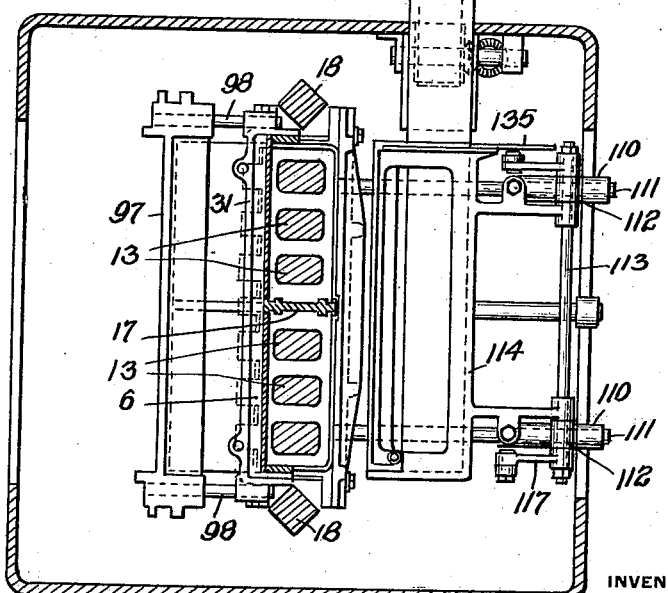
Figure 5:
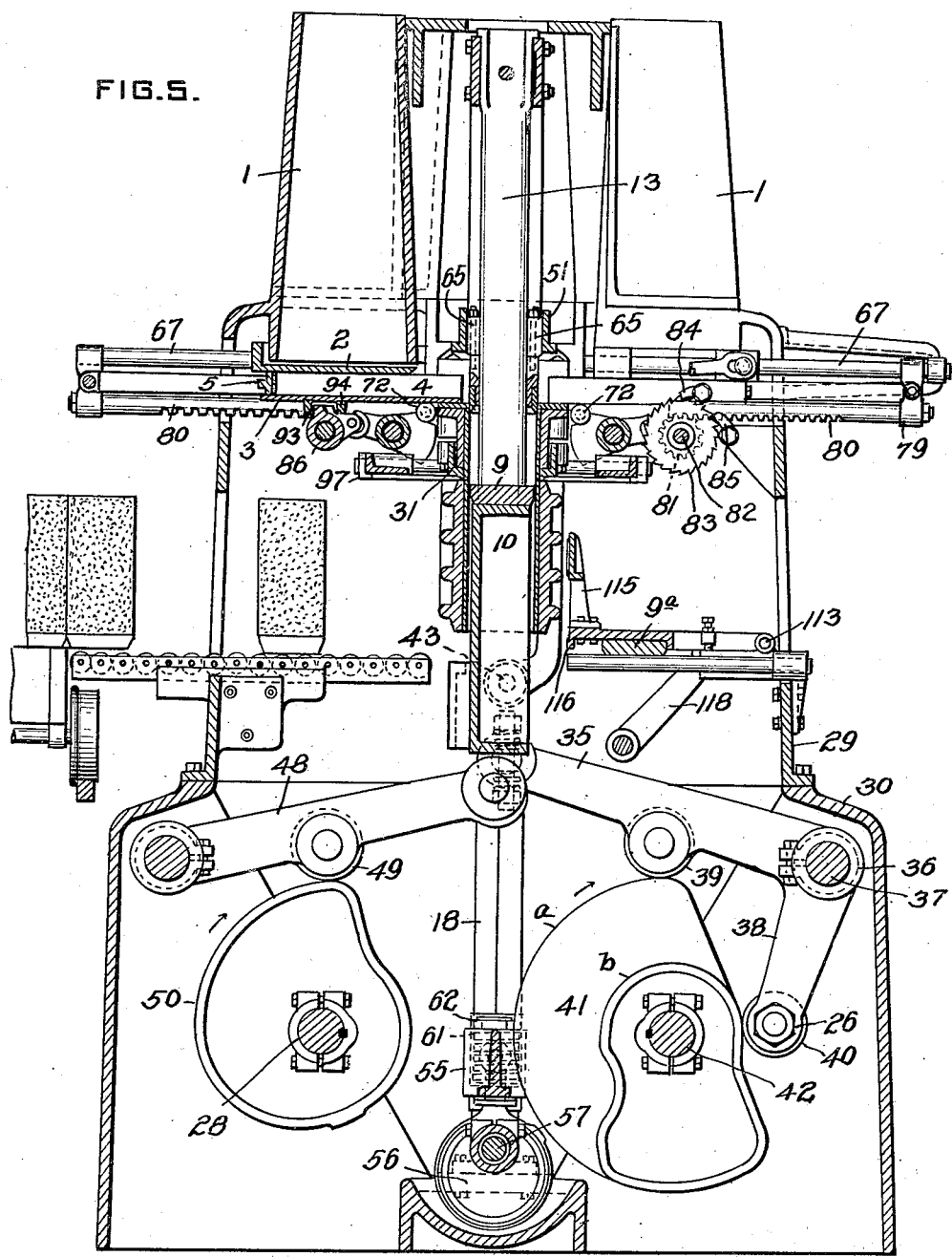
Figure 6:
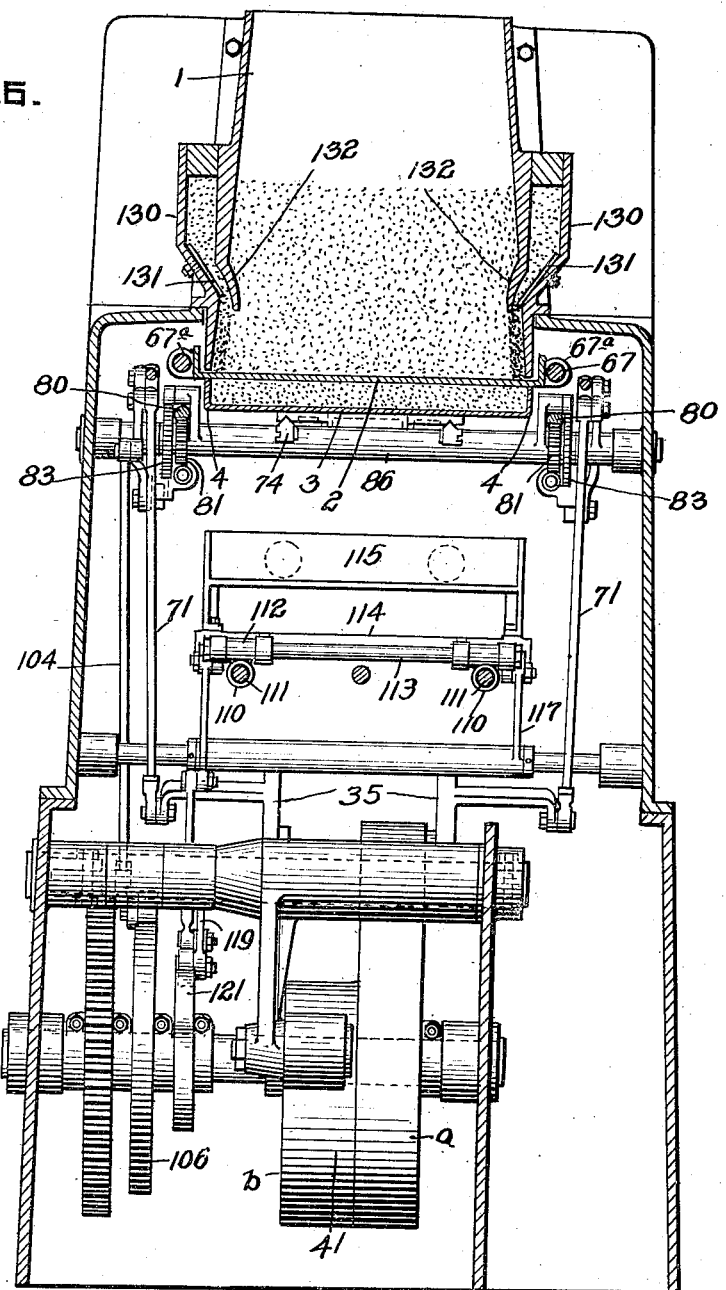
Figure 7:
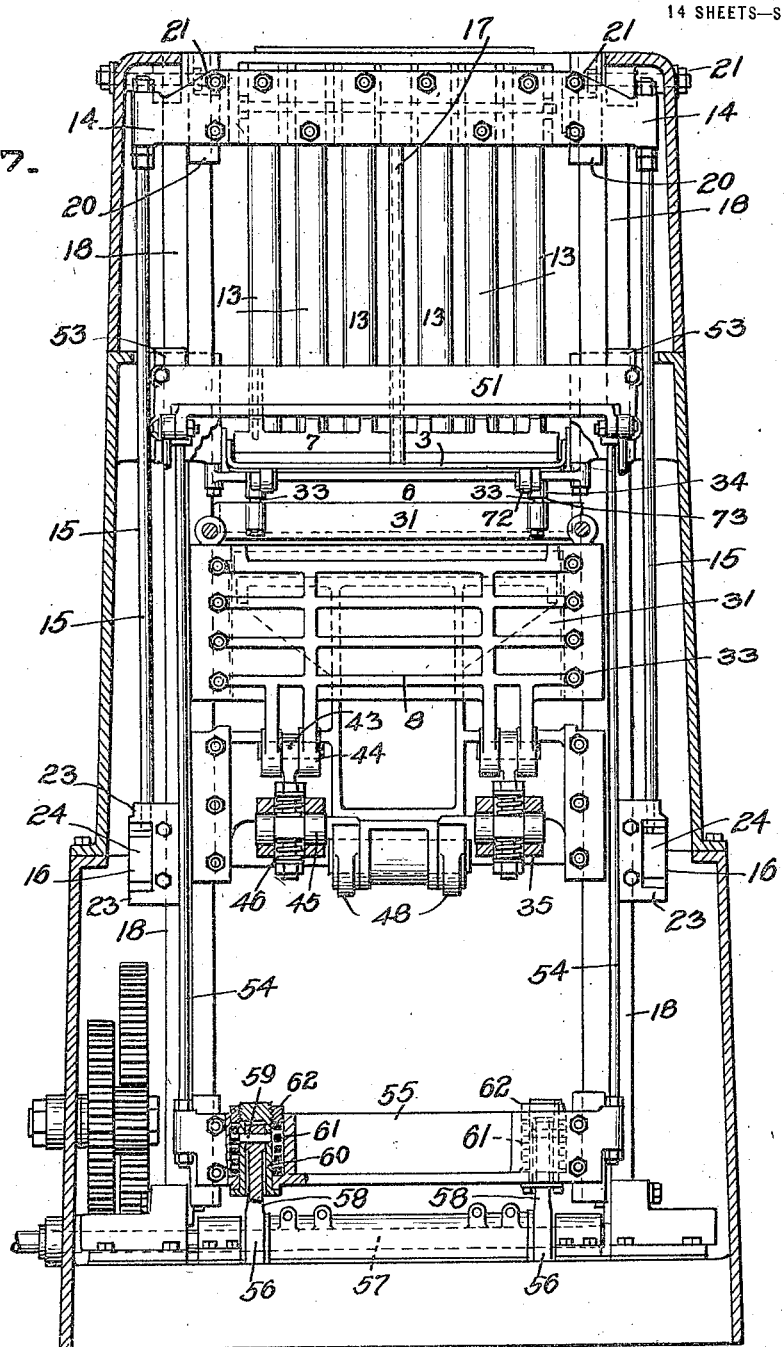
Figure 10:
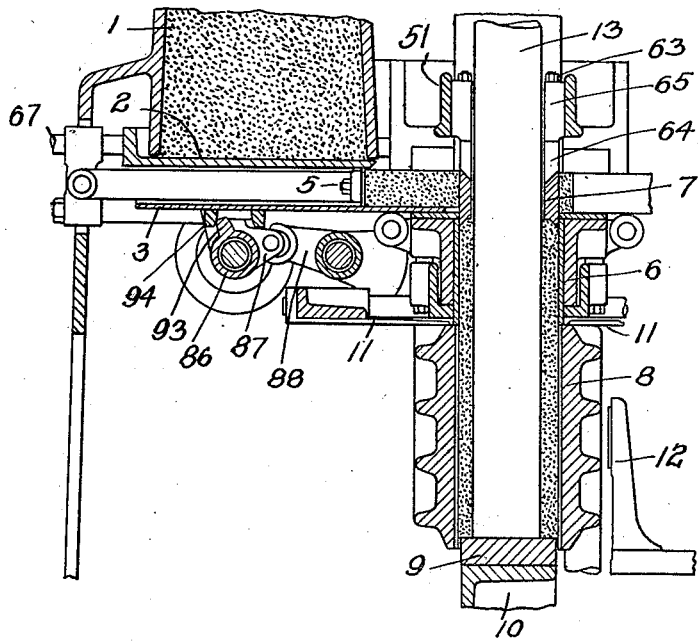
Figure 11:
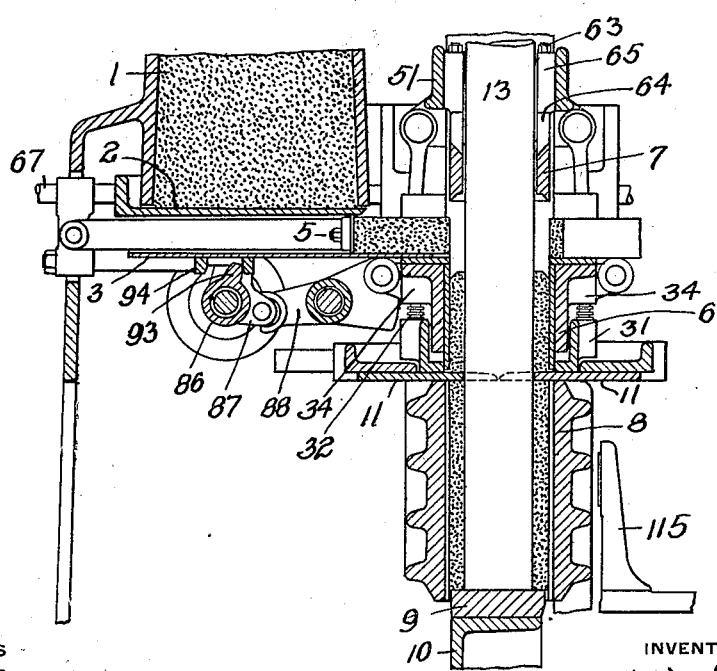
Figure 12:
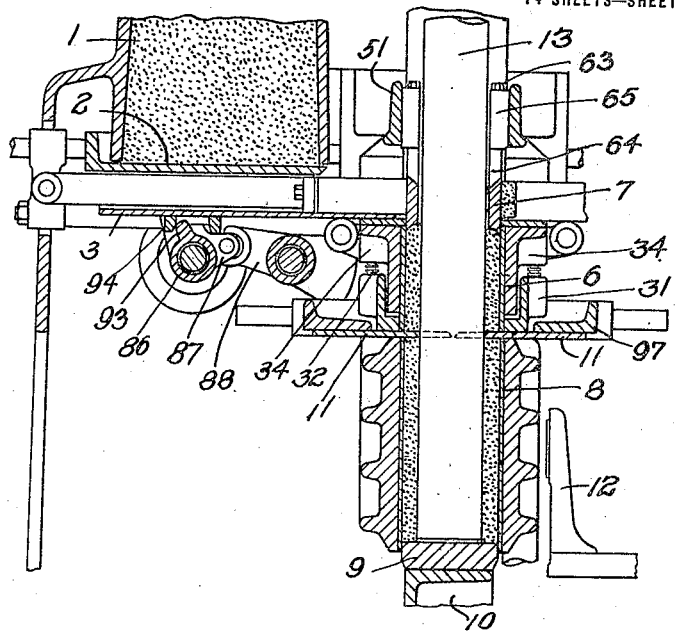
Figure 13:
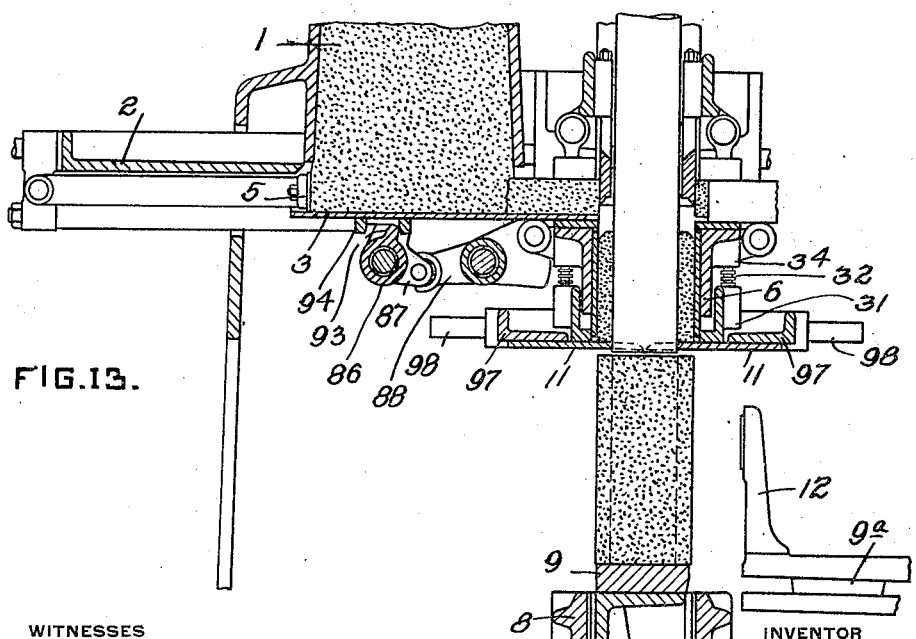
Figure 21:
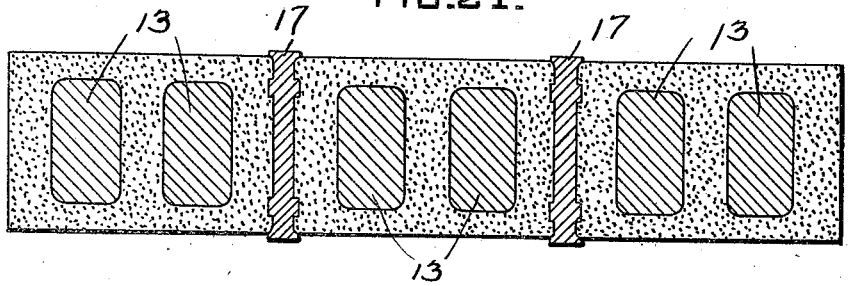
Figure 22:
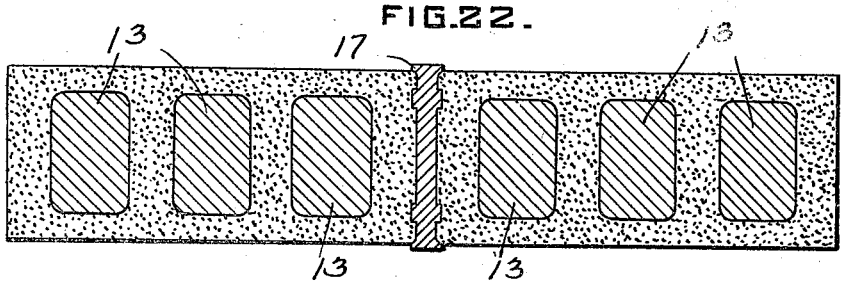
Figure 23:
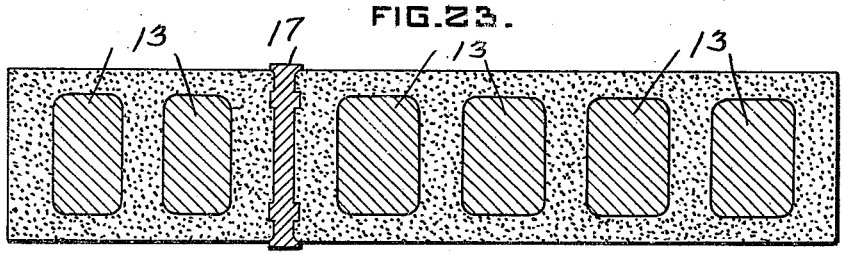
Figure 24:
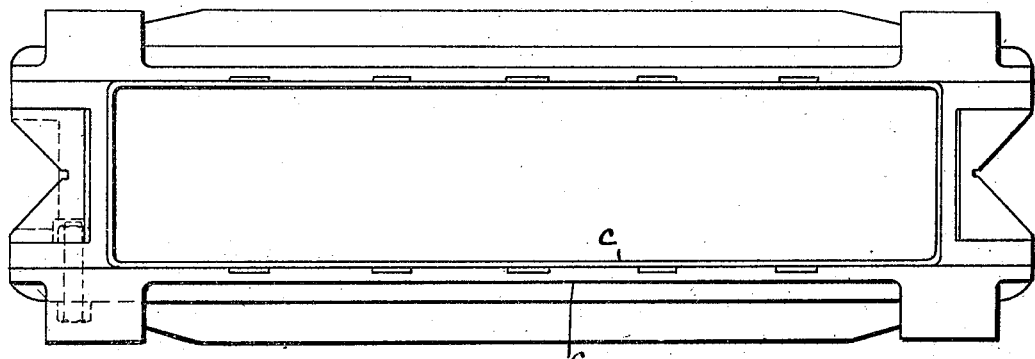
Figure 29:
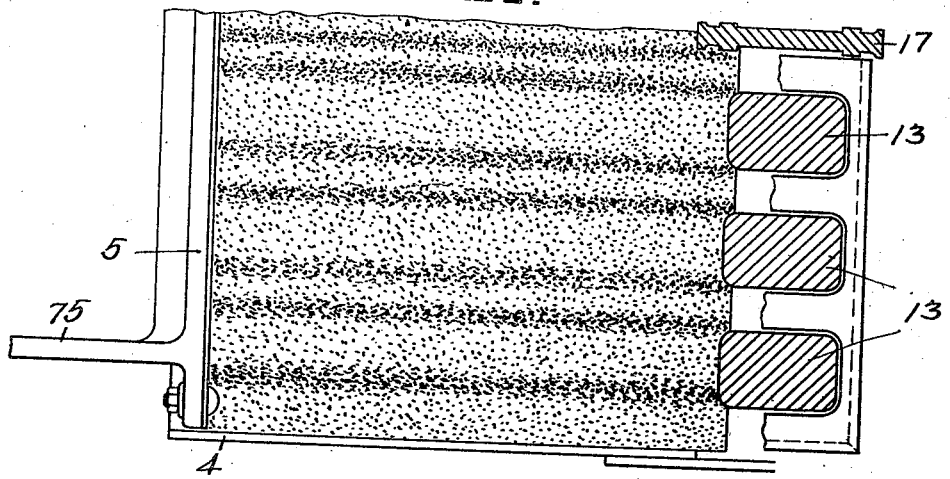
Figure 28:
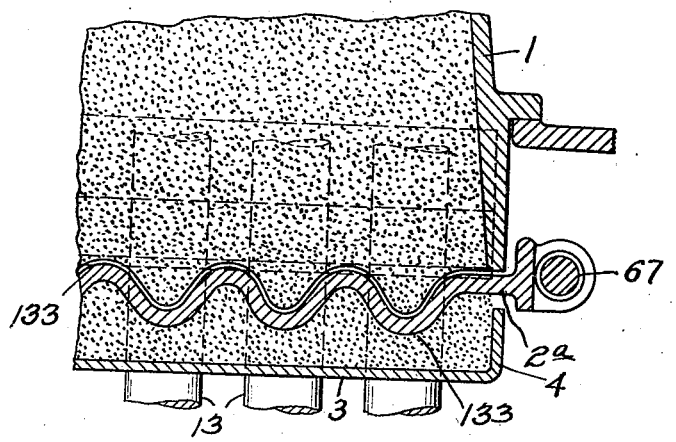
Figure 30:
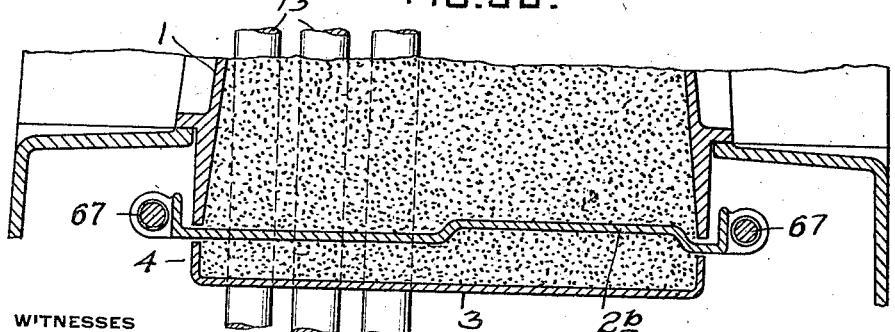

In the accompanying drawings forming a part of this specification, Figure 1 is a sectional elevation of a machine embodying improvements claimed herein; Figs. 2, 3, and 4 are sectional plans, the plane of section being indicated respectively by the lines II—II, III—III and IV—IV, Fig. 1; Fig. 5 is a sectional elevation showing particularly the mechanisms for operating the shutters, feed plates and pusher; Fig. 6 is a side elevation, the lower portion of the inclosing casing being removed, showing the feed hopper, a slab feeding means in section; Fig. 7 is a side elevation, the casing being removed; Figs. 8, 9, 10, 11, 12 and 13 are sectional views showing the several positions of parts directly operating on the plastic material, Fig. 8 showing the pressing head in lowest position and the pusher about to move forward to feed material, Fig. 9 showing pressure head up and pusher and feed plate advanced, Fig. 10 showing block in retaining mold and position of parts just prior to short downward movement of retaining mold to permit inward movement of knives, Fig. 11 shows retaining mold lowered and knives forced inward, Fig. 12 shows knives forced in and retaining mold raised to press knives against lower end of shaping mold; Fig. 13 shows knives in position under block in shaping mold, retaining mold lowered and cores drawn from severed article and ejector advancing to push pallet and article from supporting head onto receiving table; Figs. 14 and 15 are views showing steps to remove pallet and article and place new pallet on pallet-head; Fig. 16 is a sectional plan view on a plane indicated by the line XVI—XVI, Fig. 9; Fig. 17 is a sectional detail view showing the movement of the material into the mold; Fig. 18 is an elevation of a set of cores and portions to form six hollow articles; Fig. 19 is an end view of the same; Fig. 20 is a sectional view on a plane indicated by the line XX—XX Fig. 18; Figs. 21, 22 and 23 are views similar to Fig. 20 showing different arrangements of cores and partitions; Fig. 24 is a plan view of the shaping mold; Figs. 25, 26 and 27 are detail views showing means for directing jets of water into shaping mold; Fig. 28 is a sectional detail view showing a form of shutter to shape the upper surface of the slab to facilitate distribution of material between cores; Fig. 29 is a sectional plan of slab shaped by shutter shown in Fig. 28; Fig. 30 is a sectional view showing form of shutter employed when forming cored and solid articles; Figs. 31 and 32 (Sheet 10) are detail views of mechanism for operating the feed plates, Fig. 33 (Sheet 2) is a sectional detail view showing relative positions of cores and partitions when forming solid ends on cored tiles, and Fig. 34 is a sectional view of the construction shown in Fig. 32.

The method herein described consists in its broadest features in forming tiles, blocks, bricks, etc., by superposing one upon another in a suitable mold or matrix, relatively thin layers or strata of plastic material and subjecting each layer when in place to a pressure sufficient to impart the required density, this method being applicable to the manufacture of either solid articles or articles having holes or passages therethrough. It is preferred in the practice of the method to first form the plastic material into a relatively thin sheet which is moved intermittently transversely of the mold, a section of the sheet severed and forced down upon a supporting pallet or upon a previously compacted layer and then subjected to pressure which is sufficient to spread the material uniformly and to produce the required density. As it is desired that the operative face of the pressure should have a predetermined and except under abnormal conditions, a constant range of movement, provision should be made that the compressing action will be effected in the same plane. This can be most readily effected by shifting the previously compacted body down such a distance after each pressing operation so that if the sheet is of uniform thickness, each section deposited in the mold will be subjected to substantially the same pressure.

It is preferred to form a body having two of the dimensions, as for example width and thickness, desired in the finished article, but the third dimension, e. g., length, substantially greater than that desired in the finished article, and then separating from such body a portion having a length substantially equal to such third dimension. Simultaneous with the separating of the finished portion, a support is provided for the part in process of formation, while the finished portion is separated from the mold and the latter restored to operative position.

While it is practical to form each layer or stratum from one and the same sheet, which, if a solid brick or other article is being formed, would be advanced at each feeding operation, a distance substantially equal to the width of the forming mold, it is preferred that each layer or stratum should be formed by sections of two sheets moving in opposite directions toward and partially across the end of the forming mold or matrix. This opposite feed of the sheets is especially desirable when making hollow tiles or blocks as the flow of the material to inclose the cores is thereby reduced at least one half.

The invention described herein is adapted to the manufacture of a large variety of articles, such as blocks, hollow tiles, conduits, sewer pipes, bricks, etc., from plastic material as clay or concrete compositions consisting of natural or artificial cements and water, sand, and a hard aggregate such as gravel, crushed stone, slag, etc. The material when fed to the machine should have as great a plasticity as consistent with the molded article, maintaining its shape after removal from the retaining mold. While the embodiment of the improvements shown herein is adapted to the manufacture of hollow building tiles, changes such as will readily suggest themselves to those skilled in the art, will adapt the mechanism to the manufacture of other articles, and hence the broad claims made herein should not be construed as limited to the manufacture of such tile, but cover operations and combinations of elements applicable to the manufacture of a large variety of articles.

As the mechanism employed for the double feeding of the material to shaping mechanisms are duplicates, one of the other, the description thereof will be confined to one of the mechanisms. The material having the desired consistency is charged into the hopper 1 which is made slightly flaring from the upper end to facilitate the downward movement of the material. The lower end of the hopper is closed by a movable shutter 2 and below the shutter is arranged a feed plate 3 having a width equal to the width of the matrix in which the shaping of the material is to be effected. When the shutter is withdrawn, the material will drop onto the plate 3 on which it is retained by upturned flanges 4 along the sides of the plate and by a pusher block 5 supported by, but movable independent of the feed plate, as hereinafter described. After the material has been deposited on the plate 3, the shutter is shifted closing the lower end of the hopper and forming the top of what may be termed the feed box, consisting of the plate 3 with its side flanges, the pusher and the shutter, the end of the box opposite the pusher being open for the discharge of the sheet or layer of material. The shaping mold or matrix and the feed plate are arranged in such relation to one another that the plate, when shifted, will project as hereinafter described, to a greater or less extent over the open upper end of the mold 6, dependent upon whether one or two feed mechanisms are employed.

The feed of material to the shaping mold is effected by the forward movement of the pusher 5, which bears against the slab of material resting on the feed plate 3, the latter moving with the material by reason of the frictional engagement between the material and plate. After such a movement of the material and feed plate as will cause the projection of the desired amount of material over the forming mold, a pressing head 7 having peripheral cutting edges moves down toward and generally a short distance into the mold box; this pressing head having transverse dimensions slightly less than the internal dimensions of the mold box so that the presser may move down therein. As the presser begins its downward movement, the feed plate is moved back out of the path of movement of the presser, but the pusher is held stationary, preventing any backward movement of the material with the plate so that a portion of the sheet or slab of material will be left unsupported and overhang the forming mold; the presser in moving down will complete the severance of the overhanging portion and force it down into the mold. As the presser continues its movement, this section of material will be spread out laterally and uniformly over the surface either of the pallet or of a previously formed and compressed surface of the material. The movement of the presser is continued so that this material just deposited within the mold will be subjected to a pressure equal to the pressure necessary to produce the desired density of this layer, i. e., the density desired in the completed articles. After a layer has been compressed, the presser will move upward, the pusher and slab of material, the latter carrying the feed plate with it will move forward a predetermined distance, bringing another section of the slab or sheet of material above the mold; the presser again moves down and the feed plate is withdrawn, the pusher and slab of material remaining stationary.

The blades or cutting portion of the presser, are beveled or inwardly inclined and will therefore operate to spread the material inwardly. This feature is of especial importance in making hollow articles as the inclined surfaces of the blades will move the material piled up against the cores, when the slab is fed in, into the spaces between the cores. These inclined or beveled surfaces will act against the large pieces of stone or gravel and force them into the body of the layer, thereby displacing the relatively liquid mortar or binder and force it to the peripheral surface of the layer, producing a smooth surface in the completed article. And further, as the large pieces are forced inwardly into the area operated on by the flat face of the presser, these large pieces of aggregate will be caused to break through the compacted smooth surface of the previous layer when the presser bears upon the layer being formed, thereby breaking up any stratification, the larger pieces of one layer being forced into the adjacent layers. A further advantage of providing inwardly inclined surfaces at the periphery of the presser is that V-shaped cavities are formed between the inner surfaces of the shaping mold and the incline or bevel produced by the action of the edge of the presser, which cavities will be filled in by the material from the next succeeding section of slab deposited in the mold, so that succeeding layers are interlocked.

Immediately below the shaping mold or matrix 6 and in line therewith, is arranged a retaining mold 8 into which the shaped article is forced from the shaping mold. The rubbing of the surfaces of the shaped material along the surfaces of the shipping mold and also the surfaces of the retaining mold, as hereinafter described, has a troweling or smoothing effect on the surfaces of the material. At the beginning of the operation, a pallet 9 made of wood or other suitable material is moved up to within a short distance below the upper edge of the retaining mold, 6, *i. e.*, within a distance not greater than the thickness of a layer of material when compressed. This pallet is supported by means of a movable head 10 which in turn is supported by means adapted to move down step by step, or with a slow continuous movement, and to be raised its entire stroke by mechanism hereinafter described.

As the operations of feeding in, cutting off and compressing material progress, the head 10 and pallet gradually move down through the retaining mold, the article as it is being formed, moving along down under the action of the presser.

As soon as a sufficient length of material has been shaped and a portion of this shaped material equal to the length of the desired article passes into the supporting or retaining mold, the latter is moved down a slight distance and the shaped body cracked transversely by reason of the fact that a portion of such body will be frictionally held within the shaping mold and a portion within the movable mold box; the crack or line of separation will be approximately coincident with the line of separation of the shaping and retaining mold as indicated in dotted lines in Fig. 12, *i. e.*, with a small portion of the material projecting up above the upper end of the retaining mold. As soon as the retaining mold is moved down to effect the cracking as above stated, knives 11 are pushed in from opposite directions and as the edges are beveled as shown, the material projecting above the body within the retaining mold will be shaved off and forced back up into the portion of the body held within the shaping matrix. To complete the finishing of the upper end of the completed article in the retaining mold and the lower end of the block in process of formation, the retaining mold is moved up against the knives 11 forcing them against the lower end of the shaping mold and while the molds and knives are thus held together, the presser will be forced down on the block in the shaping mold. As soon as the finishing of the ends of the completed article and the lower end of the body in process of formation has been effected, as above described, the retaining mold is moved down entirely clear of the article resting upon the pallet which in turn is supported by the head 10. As soon as the supporting mold has been moved below the pallet on which the finished article rests, a shifting head 12 adapted to bear against the edge of the pallet and also the side of the completed article, moves forward, pushing the pallet and article onto a receiving table. By the same movement this shifting head carries with it a second pallet 9ª into position above the head 10 and prior to its backward movement the shifting head is raised so that in its backward movement it will clear this pallet 9ª and leave it in position on the head 10 which is again raised to carry the pallet 9ª into contact with the lower end of the body in process of formation. At the same time with the upward movement of the head and pallet, the retaining mold is also moved up. This stripping movement of the retaining mold will have a troweling or smoothing effect on the surfaces of the article.

During the lowering of the movable retaining mold clear of the formed article and pallet, and the return of the head and retaining or supporting mold and new pallet to operative position, the knives 11 remain in position under the lower end of the article in process of formation, but as provision is made to stop the feed of material into the mold, simultaneous with the movement of a length of block equal to that of the desired article into the retaining mold, the formation of block is stopped, until the retaining mold and the head 10 with a new pallet have been raised and the knives withdrawn.

The above described operations are carried out whether a solid block is being formed or material is being compressed around cores to form a hollow tile or other hollow article. When it is desired to form a hollow block or other hollow article, a series of cores 13 are suspended from a movable head 14, their lower ends projecting at the beginning of the operation through the shaping mold and their ends in contact with the pallet. As has been hereinbefore described, the head 14 in which the upper edge of the cores are secured, is connected by rods 15 to a lower head 16 which rests upon a lever, the movement of which will correspond with the rate of movement of formation of the body in the mold matrix and the cores will move down as the shaped body moves down through the shaping matrix and the supporting mold. When forming cored articles, the material is fed in laterally and in a direction at right angles to the axes of the cores and it is preferable to employ two feeding mechanisms so that the material may be deposited more uniformly into the shaping mold, and will have to flow short distances under the pressure of the pressing head. The pressing head, when forming hollow articles, will reciprocate along these cores, openings being formed through the head only slightly longer than the transverse dimensions of the cores.

It will be understood that when stripping the supporting mold from the finished article, the cores are simultaneously pulled upward, the knives 11 serving as stops to prevent the movement of material from the finished article up with the cores. In order to facilitate the withdrawal of the cores from the block, they are made slightly tapering, and the mechanisms operating the several parts, i. e., the movable retaining mold and the head carrying the cores and the presser are all so timed in their operations that as the mold starts down and the cores begin to move up, the presser head will strike the upper end of the block in the forming mold. This movement of the cores up through the finished article, will effect a smoothing of the inner surfaces of the article.

Figure 33:
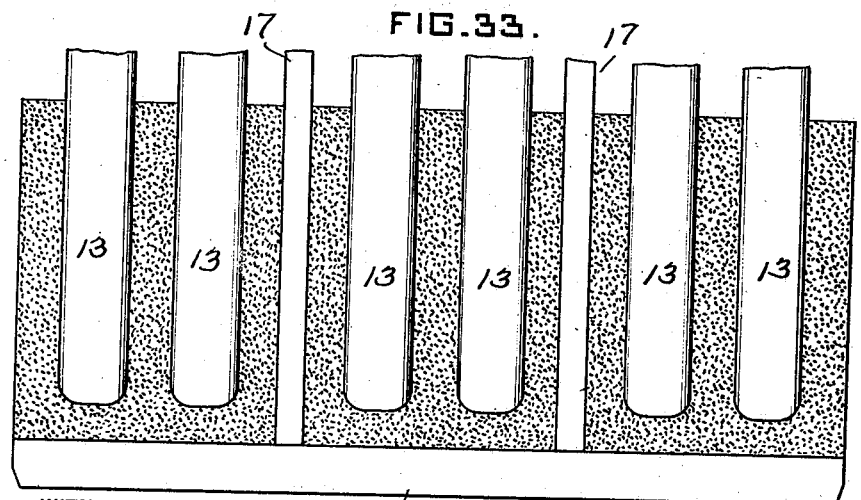

In general it is preferable to employ molds of a width which is a multiple of a plurality of the articles to be formed. In the construction shown herein the shaping mold and the retaining mold are formed of such a length that two, three, or more articles may be formed simultaneously by the employment of suitably arranged partitions 17 secured in the core head and extending down to the pallet and always movable with the cores. As it will be desirable to form some hollow tiles, etc. with solid ends, as shown in Fig. 33, the cores will be made shorter than the partitions so that the ends of the cores will not rest on the pallets and material will flow between such ends and the pallets. In such cases it is preferred that the lower portions of the cores should be rounded or inclined to facilitate the flow of the material.

The mechanisms for carrying out the operations hereinbefore described are preferably inclosed in a sectional case or shell, within which are arranged the posts or pillars 18 serving as guides for the head 14 and blocks 16 of the core frame, the presser 7, presser pulling head, the movable retaining mold and the pallet support. These guides pillars have their ends firmly secured to the base and the top section of the inclosing case which carries the material feeding mechanism, and as the middle shell section which supports the shaping mold is firmly secured to the other sections, all of the elements of the mechanism will be rigidly held in proper alinement.

In practical operation, sets of cores 13 and partition plates 17 would be formed dependent upon the character of articles to be formed. As for example, in Fig. 23 is shown a relative arrangement of cores and partitions for forming two hollow tiles simultaneously, one wider than the other, while in Fig. 21 is shown an arrangement for the manufacture of three tiles. It will be understood that the number and relative positions of partitions employed will depend upon the number and widths of the tiles desired, and that if a tile having a width equal to that of the mold is desired, no partitions will be used. The cores and partitions or partitions forming a set, are arranged in suitable relation and suitably spaced, and then tied together by a bolt as shown in Figs. 18—19 so that by withdrawing transverse bolts, one set can be removed and another substituted between the sides of the core supporting head 14. Suitable guide blocks 20 adapted to travel along the posts 18 are secured by bolts 21 in the head 14. The cores and partitions are made of such a length that when the head 14 is at its highest position, the lower ends of the cores and partitions will bear upon the pallet carried by the head 10 when the latter is at its highest position.

The head 14 is connected by rods 15 to blocks 16 adapted to slide along the posts 18 and provided with suitable bearings 23 engaging the ends of levers 24 which are rigidly connected by web 25 and have mounted thereon rollers 26 resting on the peripheries of cams 27 secured on the shaft 28.

The shaping mold is formed by stationary box 6 secured by bolts to inwardly projecting flanges 30 on the middle section of the inclosing case or shell. The mold box is provided with an extension at its lower end, preferably formed by the lower portions of the hard steel liners c, said extensions being surrounded and braced as against distortions by a frame 31 which is movably connected to the mold box by bolts 33 extending up from the frame through lugs 34 on the mold box. Springs 32 surround the bolts and bear at their ends against the lugs and frame to force the latter down as hereinafter described. The material is fed into the upper end of this shaping mold and is compressed layer by layer therein. The block as it is formed, moves down through the shaping mold and into the retaining mold 8 provided with hard steel liners having the same internal dimensions as the shaping mold. This retaining mold is adapted to be supported in operative position to prevent lateral distortion of the block and to be shifted as hereinafter described by any suitable means, as for example, by a lever having twin arms 35 extending from a sleeve 36 loosely mounted on shaft 37. This sleeve is also provided with arms 38 arranged at an angle to the arms 35, as shown in Fig. 5. Rollers 39 and 40 are so mounted on the respective arms as to bear on the cam surfaces a and b formed on the disk 41 secured on the shaft 42. This construction insures the positive shifting of the retaining mold for purposes hereinafter described. It is preferred that the mold should be yieldingly connected to the lever arms 35 and to this end eye bolts 43 are connected to lugs 44 on the mold and the stems of the bolts pass down through pins 45 passing through holes in the lever arms and springs 46 surrounding the stem on opposite sides of the pins as shown in Fig. 7. When it is desired to form two or more tiles or other articles at the same time, suitably arranged partitions 17 are employed as hereinbefore described. These partitions are made a little wider than the internal width of the mold boxes, and grooves are provided in the sides of the boxes for the reception of the edges of the partitions as shown in Figs. 3 and 4, said grooves being preferably formed by making the liners in sections and spacing them suitable distances apart.

As above stated, the blocks are built up on a pallet 9 which is moved down as the layers are formed on the upper end of the block. This pallet may be formed of wood or other suitable material and has transverse dimensions approximately equal to the internal dimensions of the mold boxes and is supported by a pallet head 10 which has its lower end connected to the inner ends of twin levers 48 provided with rollers 49 loosely mounted on pins carried by the levers, said rollers resting on a cam 50 on the shaft 28. This cam is so constructed as to permit of the pallet head being moved down only as layers are added to the upper end of the block and in direct proportion to the thickness of the superimposed compressed layer. This movement of the pallet head and also of the cores which rest on the pallet, is continuous until a length of block equal to that of the article to be formed has passed into the retaining mold at which time further downward movement of the pallet head and cores is arrested, and the supporting mold is given a short quick downward movement to crack the block transversely.

The pressing element consists of a pressing head 7, and the carrying head 51, which consists of an open frame having internal dimensions approximately equal to those of the shaping mold and having yokes 52 at its ends for the reception of the bearing blocks 53 arranged on opposite sides of the guiding pillars 18. This carrier head is connected by rods 54 to a cross-head 55 adapted to be reciprocated vertically by eccentrics 56 on the rapidly rotated shaft 57. In order to permit of a yielding of the pressing head when excess of material is fed and the full movement of the presser is prevented, a yielding connection between the eccentrics and the head 55 is provided. In the construction shown in Figs. 5 and 7, the eccentric straps are provided with stems 58 which are connected to pins 59 in shells 60 arranged in sockets adjacent to the ends of the cross head and springs 61 are interposed between seats at the lower ends of the sockets and nuts 62 screwing onto the externally threaded shells, the tension of said springs being so adjusted that a compressive action, at least equal to that desired, may be exerted on the material in the mold box, on each downward movement of the pressing head.

If articles having a width equal to that of the mold boxes are to be formed, the pressing head would be made in one piece and of a width and thickness equal to that of the mold, but when making two or more articles simultaneously, necessitating the use of partitions 17, the pressing head is made in sections of widths dependent on the positions of the partitions relative to the ends of the mold and to each other, when a plurality of partitions are employed. The pressing head, whether a unitary structure or made in sections is removably secured to the carrier frame, or head 51 by bolts 63 secured in studs 64 on the head and passing up through lugs 65 on the carrier. The detachable connection of the presser or presser sections to the carrier permits of the changing of the sections without removing the carrier and its operating connections, from the machine. The cutting blades 66 having inwardly inclined or beveled lower edges, are detachably secured by countersunk screws to the sides and ends of the presser. When making cored or hollow articles, openings are formed through the portion of the presser within the cutting edges, said openings being of such dimensions as will permit of the passage of the cores therethrough, but the edges of the openings should fit sufficiently close against the cores to prevent, as far as possible, any of the material being forced between the surfaces of the cores and the edges of the openings.

As hereinbefore stated, the material is pushed from one or opposite sides over the mold and into the path of movement of the presser head 7, and it is preferred that the material previous to its being fed to the mold should be given such a preliminary slab or sheet-like shape as will insure an easy and uniform distribution of the material across the mold by the action of the presser. To this end, material having a proper consistency is delivered or supplied into a hopper or hoppers 1 having an outward and downward flare so as to facilitate the downward movement of the material through the hopper. The lower ends of the hoppers are normally closed by movable shutters 2 which are provided on their sides with sleeves 67ᵃ mounted on the guide rods 67 and one of said sleeves on each side of the shutter is provided with a projection, said projections engaging ends of links 68 which have their opposite ends connected to levers 69. These levers are so connected by pitmen 70 that the shutters will be simultaneously shifted but in opposite directions. As it will be generally preferable that the material should be discharged from the hoppers onto the feed plates at the time the movable retaining mold is stripped from a completed article, one of the levers 69 is connected by rods 71 to a member of the mold operating means, as for example, to the levers 35. Below the shutters are arranged the feed plates 3 having their ends turned up to form retaining flanges 4. The feed plates are so supported adjacent to the shaping mold by rollers 72 loosely mounted on studs or pins secured in lugs 73 on the sides of the mold box and by curved members 74 as will be hereinafter described, so that the flanges 4 of the plates will bear against the under surfaces of the shutters, as shown in Fig. 6, thus forming boxes or troughs having their tops and bottoms formed by the shutters and plates and their ends by the flanges 4. The ends of these troughs adjacent to the molds are open for the passage of the material to the molds which is effected by intermittently moving pushing blocks 5. The supports for the feed plates are so arranged that plates incline slightly downward from their outer ends so that as they are moved inwardly the slabs of material resting thereon will move down and the friction between the upper surfaces of the slabs and the under surfaces of the shutters will be greatly or entirely reduced. These pushing blocks which have their front faces protected by hardened steel strips, are provided with arms 75 having at their outer ends sleeves 76 loosely encircling the shafts 77 so that the blocks are mainly supported by the feed plates. The ends of these shafts are secured in blocks 79 having sleeves at their ends, one sleeve of each block being secured to the outer ends of rack bars 80 while the sleeves at the opposite ends of the blocks are slidably mounted upon the guide bars 67 on which are also mounted the sleeves 67ᵃ of the shutter as hereinbefore stated. The rack bars 80 are engaged by pinions 81 secured on the countershafts 82 on which are also secured the ratchet wheels 83. These ratchet wheels are engaged by movable pawls 84 and by retaining pawls 85. The pawls 84 are pivotally mounted on arms extending from sleeves 86 from which extend also arms 87 forming one member of knuckle joints, the opposite members of said joints being formed on the ends of pivotally mounted arms 88. These opposite ends of these arms 88 are provided with spaced lugs 89, and between these lugs extend arms 90 on sleeves mounted on the shafts 91. The outer end of these arms 90 are connected by adjustable links 92 to the carrier 51 of the presser head. In this construction, when the carrier of the pressing head moves down, the arms 90 will be brought into contact with the lower lugs 89 thereby so shifting the sleeves 86 with its arms that the pawls 84 are moved back along the ratchet wheel the desired distance for the next forward feed of the material pusher and feed plate. As the carrier moves up, the arm 90 will be shifted but will not contact with the upper lug 89 until after the pressing head has moved up such a distance that the feed plates will pass under the pressing head when the pushing blocks are moved inwardly by operating the described mechanisms. The continued movement of carrier after contact of the arm 90 with the upper lug 89, will shift the pawls 84 so as to turn the ratchet wheels to shift the rack bar 80 and the pushing blocks with which it is connected to feed forward the pusher through the described connection and this movement will by reason of the friction between the material and the feed plates on which it rests, move forward the feed plates carrying with them the slabs of material until sufficient amounts will overhang the mold. On the sleeves 86 are also formed lugs 93 adapted to project up between lugs 94 on the undersides of the feed plates. When these sleeves are rotated so as to move the pawls 84 forward to shift the ratchet wheels, the lugs 93 will be turned toward the mold boxes and as the lugs on the plate will follow it, they will be in the position shown in Figs. 8 and 9. As the carrier and pressing head move down, the sleeves 86 will be rotated in the opposite direction and the lugs 93 engaging the rear lugs 94 will withdraw the feed plates to the positions shown in Fig. 10, or out of line of movement of the pressing head. These step by step movements of the pushers and the reciprocation of the feed plates are continuous until a sufficient length of the block to form the desired article has passed down into the retaining mold, material more than sufficient to form the desired article being fed upon the feed plate upon the opening of the shutter. As the retaining mold is drawn down by the lever 35 to strip the completed article, the levers 69 will be shifted in a direction to move the shutters outwardly. In their outward movements, these shutters will strike against the portions of the blocks 79 surrounding the guide rods 67 of the shutters and thereby force the pushing blocks back, but provision is made prior to this backward movement of the pushing blocks to disengage the interengaging members of the mechanisms employed for effecting the forward movement of the pushers. In the construction shown, provision is made, as by means of pivotally mounted curved arms 95 to raise the pawls 84 and 85 out of engagement with the respective ratchet wheels. (See Figs. 31 and 32).

As shown in Fig. 32, the pawls project laterally beyond the ratchet wheels and under these projecting portions extend flanges $d$ on arms 95. These arms are shifted by means of plates 96 mounted on and frictionally driven by the hubs of the levers 69 and have curved faces over which projections $e$ on the undersides of the arms 95 will ride when the levers 69 are actuated to retract the shutters. At one end of these curved portions are formed notches to permit the arm to drop and allow the pawls to again engage the ratchet wheels where the feed of material will again begin.

As hereinbefore described, the pressing head carrier is yieldingly connected to its actuating mechanism so that in case too great a quantity of material is fed into the mold box, the carrier and head will not make a full stroke. In case the pressing head does not make such full stroke, the pawls 84 being operated by the carrier will move back along the ratchet wheels distances less than normal, proportional to the reduced length of stroke of the pressing head and hence the succeeding feed of material will be reduced. In other words, the means employed for feeding the material is so constructed and so operated by the pressing head carriers, that the feed of material following each pressing operation will vary inversely as the length of travel of the pressing head during the operation.

As hereinbefore stated, provision is made after a sufficient portion of the block to form the desired article, has passed down into the retaining mold, to move such mold and the pallet supporting head a short distance down, or sufficient to crack the block transversely along in about the plane of the upper end of the retaining mold, and to permit the severing knives to pass in between the shaping and retaining molds. The relative portions of the shaping and retaining molds, the frame 31 and the knives 11, during the formation of a desired section or length of block and the forcing of such section into the retaining mold is shown in Figs. 8 and 9. As therein shown, the knives 11 are slightly above the lower end of the shaping mold, and the upper end of the retaining mold is in contact with the shaping mold. As the retaining mold moves down, the section of block in the retaining mold will be pulled away from the portion of the shaping mold as shown in Figs. 10, 11 and 12. As the retaining mold moves down, the frame 31 is forced down by the springs 32, to bring the knives 11 in line with the opening between the shaping and retaining mold, as shown in Fig. 10. Following this short downward movement of the retaining mold, and frame 31, the knives which are carried by the slides 97, mounted on guide bars 98 secured to the frame, are moved inwardly thereby removing any surplus material from the upper end of the finished article in the retaining mold and forcing such surplus up against the lower end of the portion of the block in the shaping mold. This transfer of material is facilitated by beveling the front edges of the knives as shown in Figs. 11, 12 and 13. When cored articles are being formed, the blades 11 carried by these slides, have their edges notched for the reception of the cores. The slides 97 have lugs 100 at their ends between which project rollers on the lower ends of the arms 101 on the sleeve 102 which is provided with an angularly arranged arm 103 connected by a rod 104 to the levers 105 which are adapted to be shifted to move the slides inwardly by cams 106. The outward movement of these slides is effected by springs 107 under the control of cams 106. After the knives have been moved inwardly, as above described, a slight upward movement is imparted to the retaining mold and the pallet head thereby pressing the knives up against the lower end of the block in the shaping mold and causing the upper end of the finished article in the retaining mold to bear firmly against these blades or knives, at the same time the presser head pushes the block in the forming mold against the upper surface of the knives. This compressing action effects the finishing of the upper end of the completed article and the lower end of the block in process of formation. After this finishing or compressing movement of the retaining mold and the pallet head, the retaining mold is moved down from around the completed article or block resting on the pallet head and at the same time, or preferably just prior to the downward movement of the retaining mold, the cores are drawn upwardly until their lower ends are in line with the lower surfaces of the blades 11 which remain in their inner positions, in order to prevent any of the material being drawn up from the completed article by the cores.

As soon as the retaining mold has passed to a point below the pallet resting on the head, a combined pusher and pallet carrier is moved forward to push the finished block and the pallet on which it rests onto a receiving table 109. As shown in Figs. 4, 5 and 6, this pushing mechanism consists of sleeves 110 loosely mounted on guide bars 111 and provided with collars 112 for the reception of the ends of a shaft 113 carrying the platform 114. On the inner or free end of this platform is secured a vertical post 115, adapted to bear against the completed article at a point adjacent to its upper end. At the lower end of the vertical face of the pusher, is formed a slight projection 116 adapted to bear against the pallet on which the article rests. By the forward movement of the ejector the completed article and the pallet on which it rests are moved over onto a receiving table. By the same movement a new pallet 9ª is carried into position upon the pallet supporting head 10, this pallet being held within a recess transverse of the platform 114 on its underside, as shown in Fig. 5. As soon as the new pallet is in position above the pallet head 10, the retaining mold will begin its upward movement and thereby lift the platform 114 until it is entirely clear of the pallet resting on the pallet head. Thereupon the ejector is moved back to normal position. The shaft 113 to which the platform of the pallet carrier is secured, is connected to one end of a link 117 having its opposite end connected to an arm of a bell crank 118, the other arm of the bell crank being connected by a link 119 to a lever 120 adapted to be operated by a cam 121. The return movement of the pallet carrier and its parts is effected by a spring 122.

In the manufacture of articles, the completed articles remain upon their pallets until sufficiently set to permit of handling and are then removed and the pallets returned to the ejector whereby it may be shifted to position on the pallet supporting head.

While not necessary, it is preferred to employ automatic means for carrying the pallets and placing them in position within the ejector, such for example as that shown consisting of a continuously traveling belt 134 arranged at right angles to the direction of movement of the platform 114 and extending to such a point that the pallets will move from the belt into the recess in the underside of the platform and against a stop. While the ejector platform is stationary the belt will slide under the pallets resting thereon and held from movement by the pallet in the recess. When the platform is moved forward a plate 135 on the platform passes in front of the row of pallets on the belt and prevents them from movement until on the return of the platform to its outer position, thereby carrying the stop plate from in front of the row of pallets and permitting them to be shifted, the first one of of the row entering the recess in the platform.

As hereinbefore stated, it is desirable that the concrete, e. g. the mixture of cement, sand, aggregate and water should be as plastic as is consistent with the finished article, maintaining its shape when removed from the mold and while it is becoming hard or set. In case such consistency will not, however, permit of the formation of smooth finished surfaces on the completed article, water may be applied to the surfaces of the block in process of formation, as hereinafter described. As hereinbefore stated, coarse material is forced into the interior of the layer being compressed and thereby displacing fine material and forcing it to the exterior surfaces of the layers. By applying water to these surfaces formed by the fine material and by the troweling action produced by the sliding of the block through the molds, a fine finished surface can be produced. In addition to obtaining this finished surface, the water thus applied will act as a lubricant and facilitate the movement of the block through the forming and retaining molds.

A convenient means of applying water consists in forming in the upper section of the forming mold passages 123 extending around the mold, such passages communicating with the interior of the mold by fine perforations. A convenient means for supplying water to these passages 123 in the mold and of regulating its admission, is shown in Figs. 25, 26 and 27. Nozzles 124 are connected to this passage, said nozzles being provided with a spring seated regulating valve 125, the stem of said valve lying in the path of movement of an adjustable abutment 126 upon the sleeve 86, having the arm which actuates the pawl 84 for feeding material into the mold, and is so arranged that this abutment will strike the stem of the valve. The perforations are so located and the opening of the valve 125 so timed as to discharge water against the lower portion of the presser during the last portion of its down movement. Since the rocker sleeve controlling the valve remains stationary, until the presser is about midway of its up stroke, the presser will pass above the jets of water which will then strike against the cores and partitions and the water will flow over the upper portion or surface of the completed layer and into the V-shaped grooves along the peripheries of such layer.

As hereinbefore stated, the presser operates continuously although the feed of the material is stopped while the separation of the completed section from the block and the removal of such completed section from the retaining mold and onto the receiving rack is being effected, and in order that a surplus of water may not be injected into the forming mold during the above operations, an auxiliary valve 127 is employed for preventing water entering the nozzle during the cessation of the feed of material. A convenient means to this end consists of the spring seated valve 127, the stem of which will be in the path of movement of a lug 129 extending from the movable knife carrying frame 31 and the parts are so arranged that when this movable frame is in raised position as during the formation of the block, this auxiliary valve will be held open but as soon as the movable frame moves down, which occurs at the beginning of the operation of severing a completed part from the block, this valve will be seated by its spring. If desired, fine material such as ground granite chips may be mingled with the water and thus fed into the mold or the water may have a coloring material so as to color the faces of the tile.

It may at times be desirable to form the tile or block with a layer of some particular material on the surface or surfaces which will be exposed when the tile is incorporated in a building. In such cases, the hoppers are provided with pockets 130 so arranged as to direct the facing material against the sides of the mass of concrete as it passes down through the hopper into the feed box or trough as shown in Fig. 6. The movement of material through these pockets can be controlled in any suitable manner as by adjustable slide plates 131. It will be observed that this material which may be either dry or wet, will be applied to those edges of the slab which when fed into the mold will occupy or be in contact with the end wall or walls of the mold. In order to insure the flow of the facing material into the hopper, projections 132 are formed on the upper edges of the openings through which the facing material passes into the hopper. These projections will push the material in the hopper back, forming recesses into which the facing material will be forced by weights or other suitable means.

While in most cases a slab of uniform thickness throughout can be used, it may be desirable at times, especially when the material will have to travel a considerable distance in the mold under the action of the presser, as for example, when wide cores are used, to provide for the feeding of a greater amount of material in line with the spaces between the adjacent cores than directly in front of the cores. In such cases, the shutter 2$^a$ is corrugated so as to form ribs 133 on the slab in the direction of its movement into the mold, these ribs being so spaced as to be in alinement with the spaces between the cores as clearly shown in Fig. 28. And further, it may be desirable at times to form at the same time, cored and solid blocks or tiles, or blocks or tiles having a portion solid and a portion cored, as shown in Fig. 30. As will be clearly understood by those skilled in the art, more material must be fed into the mold to produce a layer extending over the entire end of the block, than is necessary when feeding between cores and when such solid and cored articles are to be formed simultaneously, the shutter 2$^b$ is constructed to form a slab or sheet having different thicknesses.

It is characteristic of the improvement described herein that the article is built up layer by layer, and when forming cored articles, it is built up around a core which is moved along as the building up progresses. It is also characteristic of the invention that each layer is subjected to substantially the same pressure and that the entire block is subjected to the same pressure as each layer is formed. While a larger quantity of material than desired may at times be fed into the mold, such overfeed is corrected by reducing the feed for the next layer below normal, the feed of material for any one layer being dependent on the length of stroke of the presser in forming the previous layer.

I claim herein as my invention:

1. As an improvement in the art of manufacturing brick, tiles, etc., the method herein described which consists in feeding in succession into a mold, quantities of plastic material, each quantity being less than that required to form the completed article, subjecting each quantity so fed into the mold to a pressure necessary to produce the desired density and to force the previously pressed portions along the mold.

2. As an improvement in the art of manufacturing brick, tiles, etc., the method herein described which consists in forming a sheet or layer of the plastic material of which the article is to be formed, such layer or sheet having a thickness less than the length of the desired article, feeding this layer or sheet into a mold in successive increments and subjecting each increment to substantially the same pressure.

3. As an improvement in the art of making bricks, tiles, etc., the method herein described which consists in feeding in succession into a mold, masses of plastic material each mass having less than that required to form the desired article and subjecting each mass to pressures acting on the mass at an angle the one to the other.

4. As an improvement in the art of making bricks, tiles, etc., the method herein described which consists in feeding in succession into a mold masses of plastic material, each mass being less than that required to form the desired article, subjecting each mass to pressure and reducing the transverse dimensions of the upper section of each layer so formed, and causing portions of the next layer to overlap the such reduced portion.

5. As an improvement in the art of making brick, tile, etc., the method herein described which consists in feeding in succession into a mold masses of plastic material each mass being less than that required to form the desired article, subjecting each mass to pressure and forcing inwardly toward the axis of the article large pieces of the plastic material and thereby forcing the finer portions of such material to the peripheries of the layers.

6. An an improvement in the art of manufacturing hollow bricks, tiles, etc., the method herein described which consists in feeding in succession into a mold and in a direction at an angle to the axes of cores in such mold masses of plastic material less than that required to form the finished article, distributing such successive masses transversely of the mold, around the cores and subjecting each mass to the same pressure and forcing the previously compressed material along the shaping mold.

7. As an improvement in the art of manufacturing brick, tile, etc., the method herein described which consists in distributing plastic material into a sheet or slab, shifting such slab in a direction at right angles to the axis of the mold, severing from such slab successive increments, distributing such increments transversely of the mold and subjecting such increments to the same pressure.

8. The method herein described which consists in feeding in succession into a mold quantities of plastic material, each quantity being less than that required to form the desired article, subjecting each quantity to a pressure necessary to produce the desired pressure and regulating the amount fed following a pressing operation in accordance with stroke or length of movement of the pressure applying means.

9. The method herein described which consists in feeding into a mold quantities of plastic material, each quantity being less than that required to form the desired article, distributing each quantity uniformly around a core arranged in the mold, subjecting each distributed quantity to pressure and causing a movement of the previously shaped material and core through the mold substantially proportional to the quantity of material fed into the mold.

10. The method herein described which consists in forming continuous block from plastic material, such block having transverse dimensions equal to those desired in the finished article separating from such block a section having a length equal to that desired in the finished article and subjecting the end of the block and the adjacent end of the finished article to a finishing pressure.

11. In a machine for shaping plastic material, the combination of a shaping mold, means for feeding plastic material into the mold in quantities less than that required to form a finished article, a reciprocating pressing head, means operative by the pressing head for regulating the quantity fed to the mold at each feeding operation.

12. In a machine for shaping plastic material the combination of a shaping mold, a retaining mold, a pallet movable through the retaining mold, means controlling the movement of the pallet, means for feeding material into the shaping mold, a pressing head for compressing material in the shaping mold, and forcing the shaped material into the retaining mold.

13. In a machine for shaping plastic material the combination of a shaping mold, a movable retaining mold, a pallet movable along the retaining mold, means controlling the movements of the pallet, means for feeding material into the shaping mold, a pressing head for compressing the material in the shaping mold and forcing the shaped material into the retaining mold, and means for shifting the retaining mold from the finished block.

14. In a machine for shaping plastic material the combination of a shaping mold, a movable retaining mold, a pallet movable along the retaining mold, means for controlling the movements of the pallet, means for feeding material into the shaping mold, means for compressing material in the shaping mold, and forcing the compressed material into the retaining mold, means for separating the compressed material in the retaining mold from that remaining in the shaping mold, and means for shifting the retaining mold from the finished block.

15. In a machine for compressing plastic material into a definite predetermined shape and forcing the compressed material into a retaining mold, means for supporting the shape while in the mold, means for removing the mold from the shaped material and means for pushing the shaped material from its support.

16. In a machine for shaping plastic material the combination of a retaining mold, a movable head, a pallet supported by the head, means for compressing plastic material into a definite predetermined shape and forcing such compressed material into the retaining mold and onto the pallet, means for shifting the mold from the shape and means for pushing the pallet and shape from the head.

17. In a machine for shaping plastic material, the combination of a retaining mold, a movable head, a pallet supported by the head, means for compressing plastic material into a definite predetermined shape and forcing such compressed material into the retaining mold, means for shifting the retaining mold from the shape and means for pushing the pallet and shape from the head and means for placing another pallet on the head.

18. In a machine for shaping plastic material the combination of a retaining mold, a movable head, a pallet supported by the head, means for compressing plastic material into a definite predetermined shape and forcing such compressed material into the retaining mold, means for shifting the retaining mold from the shape and means for pushing the pallet and shape from the head, and placing another pallet on the head.

19. In a machine for shaping plastic material the combination of a mold, a pusher for moving a mass of plastic material toward the mold and a plate for supporting the plastic material in its movement toward the mold and movable therewith.

20. In a machine for shaping plastic material, the combination of a mold, a pusher for moving a mass of plastic material toward the mold, a plate for supporting the plastic material and movable therewith toward the mold and means for moving the plate away from the mold without shifting the mass of plastic material.

21. In a machine for shaping plastic material, the combination of a mold, a plate for supporting the plastic material, a hopper arranged above the plate and a shutter for closing the hopper for shaping the upper surface of the mass of material deposited on the plate, a pusher operative between the plate and shutter for advancing the material and plate toward the mold and means for withdrawing the plate without changing the position of the material with reference to the mold.

22. In a machine for shaping plastic material, the combination of a mold, a pressing head adapted to operate upon the material in the mold, a pusher for moving the mass of plastic material toward the mold, a plate for supporting the plastic material and movable therewith toward the mold and means operative by the pressing head to move the pusher toward the mold.

23. In a machine for shaping plastic material the combination of a mold, a pressing head adapted to operate on the material in the mold, a pusher for moving the mass of plastic material toward the mold, a plate for supporting the plastic material and movable therewith toward the mold and means interposed between the pressing head and the pusher whereby the movement of the pusher will be proportional to the length of the previous downward movement of the pressing head.

24. In a machine for shaping plastic material the combination of a mold, a pressing head adapted to operate on the material in the mold, a pusher, means operative by the pressing head to shift the pusher in a direction to move the material toward the mold and means for moving the pusher away from the mold.

25. In a machine for shaping plastic material, the combination of a mold, a pusher for moving a mass of material toward the mold, means for effecting a step by step forward movement of the pusher, a hopper arranged to deposit material in the path of forward movement of the pusher, a shutter for controlling the movement of material from the hopper and connections whereby the shutter in its opening movement will shift the pusher away from the mold.

26. In a machine for shaping plastic material the combination of a mold, a movably mounted plate having upturned sides arranged in operative relation to the mold, a hopper arranged above the plate and adapted to discharge material thereon, a shutter controlling the discharge of material from the hopper and adapted to effect the distribution of material on the plate, a pusher arranged to operate between the shutter and plate to advance the material and plate toward the mold and means for shifting the plate in the opposite direction without changing the position of the material relative to the mold.

27. In a machine for shaping plastic material, the combination of a feed plate, a hopper arranged above such plate and adapted to deposit material on the plate in the form of a sheet or slab and a pocket arranged at one side of the hopper and adapted to discharge a body of material different from that contained in the hopper arranged at one side of the mass moving down in the hopper and a shutter for controlling the discharge of material from the hopper.

28. In a machine for shaping plastic material, the combination of a mold, means for feeding to the mold in succession quantities of material less than that required to form the finished article, a pressing head for compressing such quantities of material and provided around its periphery with cutting blades having internally beveled or inclined surfaces.

29. In a machine for shaping plastic material the combination of a mold, having a movable bottom, a core extending into the mold and supported by such bottom, means for feeding quantities of plastic material in succession to the mold, each quantity being less than that required to form the finished article, a pressing head adapted to distribute and compress each quantity of material in the mold and around the core.

30. In a machine for shaping plastic material the combination of a shaping mold, a retaining mold in line with the shaping mold, means movable through the retaining mold for supporting material shaped in the shaping mold, a core having its lower end resting upon the movable support, a pressing head adapted to compress the material as fed into the mold and effect a downward movement of the compressed material, support and core at each pressing operation.

31. In a machine for shaping plastic material the combination of a shaping mold having a width which is a multiple of the width of a plurality of articles to be formed, a retaining mold arranged in line with the shaping mold, a head adapted to support the article as formed, a plurality of cores supported by said head and movable therewith, means for successively feeding material to the mold in quantities less than that required to form the finished article, a pressing head adapted to compress each quantity in the shaping mold and in such compressive action effect a downward movement of the previously compressed material supporting head and cores.

32. In a machine for shaping plastic material the combination of a mold having a width which is a multiple of the width of a plurality of articles to be formed, a retaining mold arranged in line with the shaping mold, a head movable in the retaining mold and adapted to form a support for the material as shaped in the shaping mold, a partition extending down through the shaping mold and supported by the movable head and a sectional pressing head for compressing the material on each side of the partition and in such compressive action effect a downward movement of the compressed material, supporting head and partition into the retaining mold.

33. In a machine for shaping plastic material the combination of a shaping mold having a width which is the multiple of the width of a plurality of articles to be formed, a retaining mold arranged in line with the shaping mold, a head adapted to form the support for the articles as formed and movable through the retaining mold, a partition and a plurality of cores extending down through the shaping mold and supported by the movable head, a sectional pressing head adapted to compact the material fed into the mold and in such compacting operation cause a movement of the compacted material, cores, partition and supporting head into the retaining mold.

34. As an improvement in the art of manufacturing brick, tiles, etc., the method herein described which consists in feeding in succession into a mold and on opposite sides of a partition extending into the mold, quantities of plastic material, each quantity being less than that required to form the completed article, subjecting each quantity on each side of the partition to a pressure necessary to produce the desired density and force the previously pressed portions along the mold.

35. As an improvement in the art of manufacturing tile, brick, etc., the method herein described which consists in feeding into a mold and on opposite sides of a partition extending in the mold, successive masses of plastic material, each mass of material being substantially less than that required to form a completed article and subjecting each of such masses on each side of the partition simultaneously to the same pressure.

36. As an improvement in the art of manufacturing tile, brick, etc., the method herein described which consists in feeding into a mold successive masses of plastic material, each mass being less than the quantity required to form a completed article pressing each mass against a previously pressed mass and causing a movement of the block so formed along the mold.

37. As an improvement in the art of manufacturing simultaneously a plurality of tiles, bricks, etc., the method which consists in feeding successively into a mold and on opposite sides of a partition extending into the mold, masses of plastic material each mass being less than that required to form the completed articles, pressing such masses against previously compacted layers, moving the blocks so formed along the mold and separating from the blocks sections having lengths equal to those desired in the finished article.

38. In a machine for the shaping of plastic material the combination of a shaping mold, means for feeding the plastic material into the mold in quantities less than that required to form the finished article, a reciprocating pressing head and means for regulating the quantity fed to the mold at each feeding operation.

39. In a machine for shaping plastic material the combination of a mold, a pressing head, a plate supporting the plastic material, a pusher for moving the mass of plastic material toward the mold and means for advancing the pusher step by step each step being a distance proportional to the amount to be fed into the mold for a pressing operation.

40. In a machine for shaping plastic material the combination of a mold a plate for supporting the plastic material, a hopper arranged above the plate, a shutter for closing the hopper and adapted to shape the upper surface of the mass of material deposited on the plate, a pusher operative between the plate and shutter for advancing the material toward the mold.

41. In a machine for shaping plastic material the combination of a mold, a pressing head adapted to operate on the material in the mold, a pusher for moving the mass of plastic material toward the mold, a plate for supporting the plastic material and means operative by the pressing head to move the pusher step by step toward the mold.

42. In a machine for shaping plastic material the combination of a mold a pressing head adapted to operate on the material in the mold, a pusher for moving the mass of plastic material toward the mold, a plate for supporting the plastic material, means for reciprocating the pusher to move the material to the mold and means whereby the movement of the pusher will be proportioned to the length of the previous downward movement of the pressing head.

In testimony whereof we have hereunto set our hands.

SHERBURNE H. WIGHTMAN.
THOMAS A. LONG.